(12) United States Patent
Jeong et al.

(10) Patent No.: US 9,903,941 B2
(45) Date of Patent: Feb. 27, 2018

(54) TIME OF FLIGHT CAMERA DEVICE AND METHOD OF DRIVING THE SAME

(71) Applicant: SAMSUNG ELECTRONICS CO., LTD., Suwon-si (KR)

(72) Inventors: Seong-Yeong Jeong, Daegu (KR); Kyu-Min Kyung, Seoul (KR); Tae-Chan Kim, Yongin-si (KR); Kwang-Hyuk Bae, Seoul (KR); Shung-Han Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 556 days.

(21) Appl. No.: 14/528,033

(22) Filed: Oct. 30, 2014

(65) Prior Publication Data

US 2015/0204970 A1 Jul. 23, 2015

(30) Foreign Application Priority Data

Jan. 22, 2014 (KR) .................. 10-2014-0007924

(51) Int. Cl.
| | |
|---|---|
| G01S 7/48 | (2006.01) |
| G01S 7/486 | (2006.01) |
| G01S 17/89 | (2006.01) |
| G01S 17/10 | (2006.01) |
| G01S 17/36 | (2006.01) |

(52) U.S. Cl.
CPC ............ G01S 7/4865 (2013.01); G01S 17/10 (2013.01); G01S 17/36 (2013.01); G01S 17/89 (2013.01)

(58) Field of Classification Search
CPC .......... G01S 17/107; G01S 7/487; G01C 3/08
See application file for complete search history.

(56) References Cited

U.S. PATENT DOCUMENTS

| | | | |
|---|---|---|---|
| 6,490,471 | B2 | 12/2002 | Svenson et al. |
| 7,193,720 | B2 | 3/2007 | Gatt |
| 8,294,809 | B2 | 10/2012 | Stettner |
| 8,363,212 | B2 | 1/2013 | Bamji et al. |
| 2011/0188028 | A1 | 8/2011 | Hui et al. |
| 2012/0257186 | A1* | 10/2012 | Rieger .................. G01S 17/107 356/5.01 |

FOREIGN PATENT DOCUMENTS

| | | |
|---|---|---|
| JP | 4213327 B2 | 1/2009 |
| KR | 10-2011-0011244 A | 2/2011 |

* cited by examiner

*Primary Examiner* — Luke D Ratcliffe
(74) *Attorney, Agent, or Firm* — Sughrue Mion, PLLC

(57) ABSTRACT

A time of flight (TOF) camera device and a method of driving the same are provided. The TOF camera device includes a pulse generator configured to generate a pulse signal, and generate a first photo gate signal and a second photo gate signal; a light source configured to irradiate an object with light emitted in synchronization with the pulse signal; and an image sensor configured to receive light reflected from the object in synchronization with the first photo gate signal during a first frame, and receive light reflected from the object in synchronization with the second photo gate signal during a second frame. The pulse generator is further configured to modulate the pulse signal so as to use a frequency of the light as a single frequency.

20 Claims, 17 Drawing Sheets

TIME OF FLIGHT CAMERA DEVICE AND METHOD OF DRIVING THE SAME

CROSS-REFERENCE TO RELATED APPLICATION

This application claims priority from Korean Patent Application No. 10-2014-0007924 filed on Jan. 22, 2014, the entire contents of which are incorporated by reference herein in their entirety.

BACKGROUND

Field

Apparatuses and methods consistent with the present disclosure relate to a time of flight (TOF) camera device, and more particularly, to a TOF camera device which can measure a real depth even when exceeding a depth determined according to a modulated frequency of a light, and a method of driving the same.

Description of Related Art

A time of flight (TOF) camera device detects an object using a phase delay, etc. generated while light modulated into a predetermined frequency is reflected and returned from the object, and is widely used in a topographical survey field or an object's posture control field, etc.

Examining an operation principle of the TOF camera device, the TOF camera device irradiates the object with modulated light. After this, the irradiated light is reflected by the object, and is returned to the TOF camera device. In this case, a distance to the object can be known by comparing phases between the irradiated light and the reflected light.

At this time, accuracy of the TOF camera device is affected by a modulation frequency, a dynamic range, or sensitivity, etc. of light irradiated from the TOF camera device, and the TOF camera device has to modulate a frequency of the light into a frequency suitable for a corresponding depth and irradiate the modulated light to the object so as to secure accuracy more than a desired level. However, a related art TOF camera device has a disadvantage in that the accuracy cannot be secured when a distance to the object is over a predetermined depth since the modulated frequency is fixed.

SUMMARY

One or more exemplary embodiments provide a time of flight (TOF) camera device which can measure a real depth when exceeding a depth determined according to a modulated frequency of a light source.

One or more exemplary embodiments of the inventive concept also provide a method of driving the TOF camera device.

In accordance with an aspect of an exemplary embodiment, there is provided a time of flight (TOF) camera device including: a pulse generator that is configured to generate a pulse signal, and to generate a first photo gate signal and a second photo gate signal; a light source that is configured to emit light in synchronization with the pulse signal to irradiate an object with the light; and an image sensor that is configured to receive light reflected from the object in synchronization with the first photo gate signal during a first frame, and to receive light reflected from the object in synchronization with the second photo gate signal during a second frame, wherein the pulse generator is configured to modulate the pulse signal so as to use a frequency of the light as a single frequency.

A frequency of the pulse signal may be equal to that of the first photo gate signal, and the first photo gate signal may have a frequency that is higher by an integer multiple than a frequency of the second photo gate signal.

The pulse generator may modulate the pulse signal so as to make the first and second frames as one period.

The image sensor may generate amplitude information of the light reflected from the object based on phase difference information between the light emitted by the light source and the light reflected from the object.

The TOF camera device may further comprise an image signal processor (ISP) that is configured to generate depth information of the object based on the amplitude information.

The ISP may determine a gesture of the object using the depth information.

The ISP may determine a depth of the object within a first region during the first frame and a depth of the object within a second region during the second frame, and the second region includes the first region.

The ISP may determine whether an image is overlapped, and if the ISP determines that the image is overlapped, the ISP adds the calculated depth during the first frame and a measurable maximum depth.

The image sensor may receive the reflected light while the first or second photo gate signal is activated.

According to an aspect of another exemplary embodiment, there is provided a method of driving a TOF camera device, the method including: modulating a pulse signal; irradiating an object with light in synchronization with the pulse signal; receiving light reflected from the object in synchronization with a first photo gate signal, and calculating a depth of the object based on the received light, during a first frame; receiving light reflected from the object in synchronization with a second photo gate signal, and determining the depth of the object based on the received light, during a second frame; determining whether an image is overlapped; and if it is determined that the image is overlapped, adding the determined depth during the first frame and a measurable maximum depth.

The modulating of the pulse signal may include modulating the pulse signal so as to make the first and second frames as one period.

The receiving of the light reflected from the object in synchronization with the first photo gate signal, and calculating of the depth of the object based on the reflected light, during the first frame, may include extracting amplitude information of the light based on phase difference information between the emitted light and the reflected light during the first frame; and calculating the depth of the object based on the extracted amplitude information.

The receiving of the light reflected from the object in synchronization with the second photo gate signal, and calculating of the depth of the object based on the received light, during the second frame, may include extracting the amplitude information of the light based on the phase difference information between the emitted light and the reflected light during the second frame; and calculating the depth of the object based on the extracted amplitude information.

The determining of whether the image is overlapped may include determining based on the calculated depth of the object, during the second frame.

A frequency of the pulse signal may be equal to a frequency of the first photo gate signal, and the first photo gate signal may have a frequency that is two times higher than a frequency of the second photo gate signal.

BRIEF DESCRIPTION OF THE DRAWINGS

The foregoing and other aspects will be apparent from the more particular description of exemplary embodiments, as illustrated in the accompanying drawings in which like reference characters refer to the same parts throughout the different views. The drawings are not necessarily to scale, emphasis instead being placed upon illustrating the principles of the inventive concept. In the drawings.

DETAILED DESCRIPTION

Figure 1:
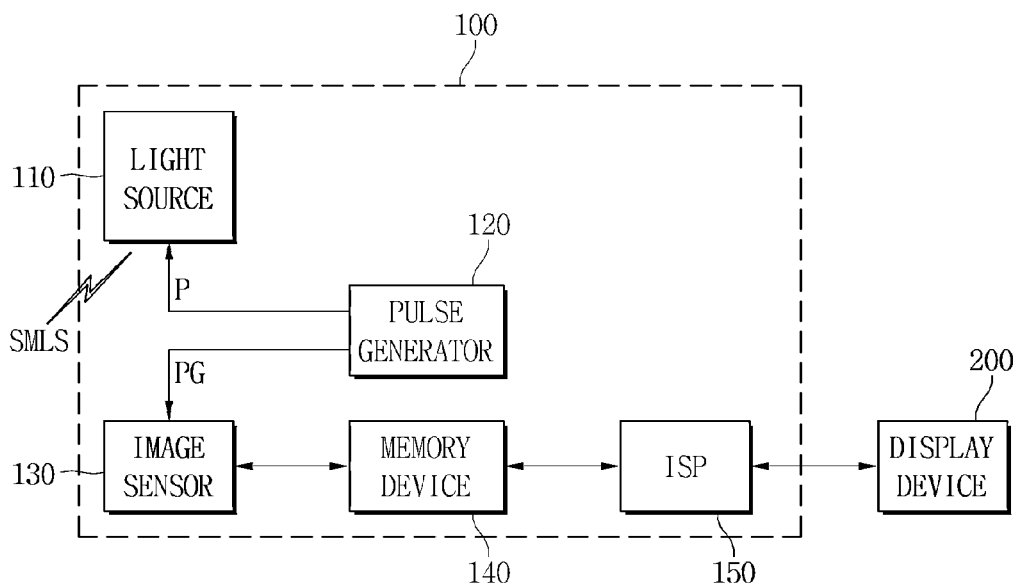
FIG. 1 is a block diagram illustrating a time of flight (TOF) camera device according to an exemplary embodiment.

Exemplary embodiments are described below in sufficient detail to enable those of ordinary skill in the art to embody and practice the present inventive concept. It will be understand that the present inventive concept may be embodied in many alternate forms and should not be construed as limited to the example embodiments set forth herein.

It will be understood that, although the terms "first," "second," "A," "B," etc. may be used herein in reference to various elements, such elements should not be construed as limited by these terms. For example, a "first" element could be termed a "second" element, and a "second" element could be termed a "first" element, without departing from the scope of the present disclosure. Herein, the term "and/or" includes any and all combinations of one or more referents.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements. Other words used to describe relationships between elements should be interpreted in a like fashion (i.e., "between" versus "directly between," "adjacent" versus "directly adjacent," etc.).

The terminology used herein to describe embodiments of the invention is not intended to limit the scope of the invention. The articles "a," "an," and "the" are singular in that they have a single referent; however the use of the singular form in the present document should not preclude the presence of more than one referent. In other words, elements of the invention referred to in singular may number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

When it is possible to implement any embodiment in any other way, a function or an operation specified in a specific block may be performed differently from a flow specified in a flowchart. For example, two consecutive blocks may actually perform the function or the operation simultaneously, and the two blocks may perform the function or the operation conversely according to a related operation or function.

Exemplary embodiments will be described below with reference to attached drawings.

Figure 2:
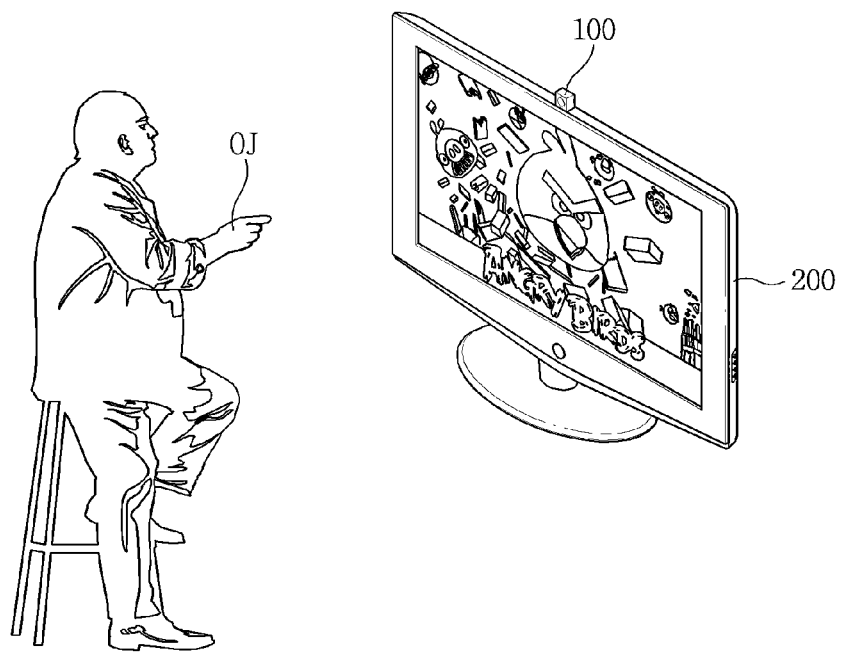
FIG. 2 is a diagram illustrating a smart television (TV) in which the TOF camera device shown in FIG. 1 may be installed.

FIG. 1 is a block diagram illustrating a time of flight (TOF) camera device according to an exemplary embodiment, and FIG. 2 is a diagram illustrating a smart television (TV) in which a TOF camera device shown in FIG. 1 may be installed.

Referring to FIGS. 1 and 2, a display device 200 may include the TOF camera device 100. In some embodiments, the TOF camera device 100 may be implemented as a three-dimensional (3D) camera of a Kinect device. For example, the TOF camera device 100 may be installed on the top of the display device 200. Alternatively, the TOF camera device 100 may be installed within a housing of the display device 200 so as to be integral with the display device 200. In some embodiments, the display device 200 may be a smart television (TV).

The term "smart TV" denotes a multifunctional TV which can use various functions such as web surfing, video on demand (VOD) viewing, a social networking service (SNS), and/or a game by combining an Internet connection function and various installed applications in a conventional TV. For example, various applications may be installed in the smart TV. The TOF camera device 100 may receive a gesture of an object OJ which is in front of the smart TV. For example, the gesture may be of person, or of a body part, such as a hand, foot, head, etc., of a person.

A related art camera device may recognize a gesture moving left and right. However, the related camera device is not able to recognize a gesture moving back and forth. This is because the related art camera device cannot measure a distance to the object. On the contrary, the TOF camera device 100 according to an exemplary embodiment can measure the distance to the object, i.e., a depth of the object, and can recognize the gesture moving back and forth.

The TOF camera device 100 includes a light source 110, a pulse generator 120, an image sensor 130, a memory device 140, and an image signal processor (ISP) 150.

The light source 110 emits a light single modulated light source (SMLS) which is a sinusoidal wave. The light source 110 emits the light SMLS in synchronization with a pulse signal P generated from the pulse generator 120. For example, when the TOF camera device 100 is installed in or on the smart TV, the object OJ may be a person who watches the smart TV.

The light SMLS may have a constant frequency. For example, the light source 110 may use a light source having an infrared light wavelength range. The light SMLS emitted toward the object OJ is reflected from the object OJ and is received by the image sensor 130. The image sensor 130 receives a photo gate signal PG from the pulse generator 120. The photo gate signal PG may be a reception synchronization signal of the image sensor 130. That is, while the photo gate signal PG is activated, the image sensor 130 may receive the light SMLS.

When the light SMLS is reflected, a phase of the light SMLS may be changed. For example, as compared with a phase of the light SMLS emitted from the light source 110, a phase of the reflected light SMLS may be varied according to a distance to the object OJ.

The image sensor 130 may store an image, and phase difference information with respect to the reflected light SMLS in the memory device 140. In some exemplary embodiments, when the light SMLS is within the infrared light wavelength range, the image may be a black and white image. In some exemplary embodiments, the image sensor 130 may be implemented as a complementary metal oxide semiconductor (CMOS) image sensor.

The memory device 140 transmits the image, and the phase difference information with respect to the reflected light SMLS to the ISP 150. The ISP 150 may calculate a distance between the object OJ and the TOF camera device 100 using the phase difference information. That is, the ISP 150 may calculate a depth of the object OJ. A method of calculating the depth according to an exemplary embodiment will be described with reference to FIGS. 8A to 9D.

The ISP 150 may recognize a gesture of the object OJ using the calculated depth information, and transmit the calculated depth information and the image to the display device 200. The display device 200 may play the image.

A measurable maximum depth according to a frequency of the light SMLS may be calculated by Equation 1 below.

$$d\max = \frac{c}{2f} \quad \text{[Equation 1]}$$

In Equation 1, dmax denotes the measurable maximum depth according to the frequency of the light SMLS. c denotes the speed of light. Generally, c is represented by a constant number. f denotes a frequency with respect to the light SMLS. For example, if f is 20 MHz, dmax is 7.5 m. Accordingly, when the distance between the TOF camera device 100 and the object OJ (i.e., a depth of the object OJ) is within 7.5 m, the TOF camera device 100 can measure an accurate distance, i.e., depth of the object OJ.

However, when the distance between the TOF camera device 100 and the object OJ is over 7.5 m, the TOF camera device 100 cannot measure an accurate depth of the object OJ. This is because an image, which is reflected from the object OJ, is overlapped when the distance between the TOF camera device 100 and the object OJ is over the measurable maximum depth according to the frequency of the light SMLS. For example, when the distance between the TOF camera device 100 and the object OJ is 8 m, the TOF camera device 100 recognizes the distance to the object OJ as 0.5 m (8 m−7.5 m). A phenomenon that the image is overlapped will be described with reference to FIGS. 3 to 6.

Figure 3:
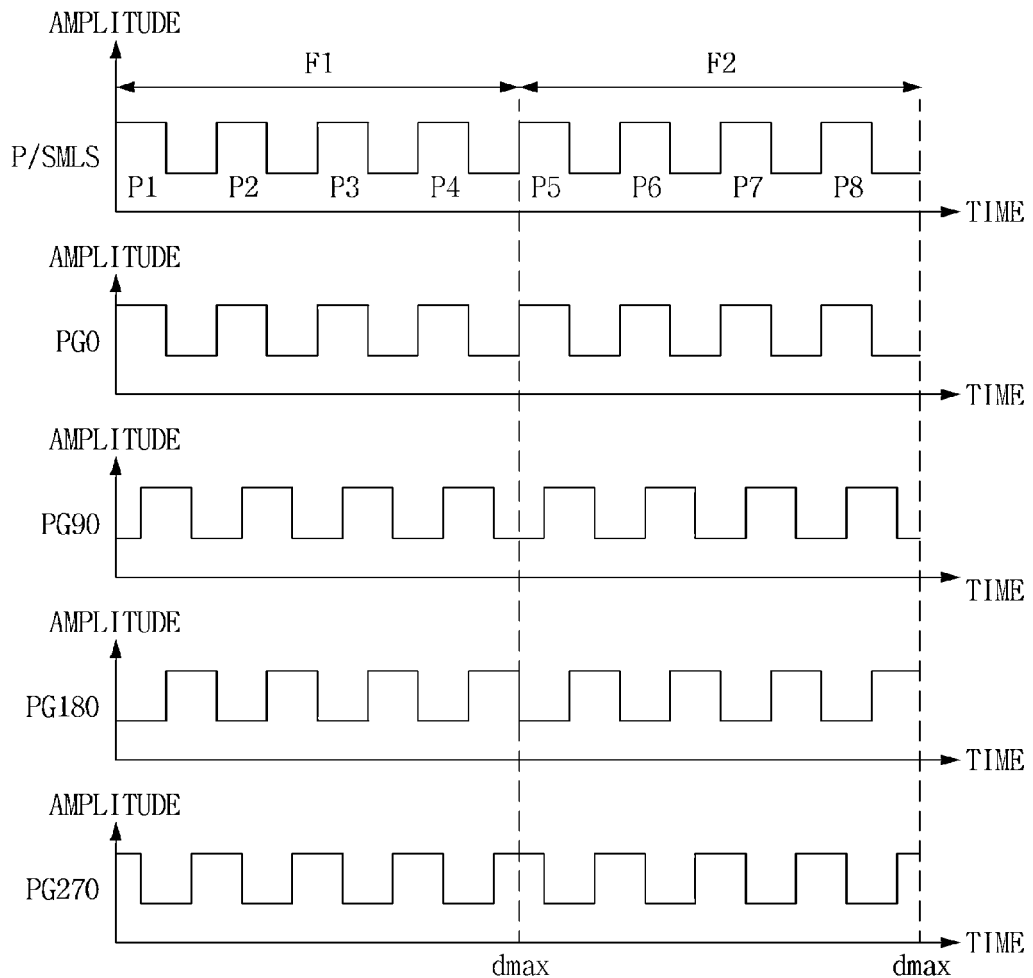
FIG. 3 is a timing diagram showing a light single modulated light source (SMLS) and a photo gate signal PG of the TOF camera device shown in FIG. 1.

FIG. 3 is a timing diagram illustrating a light SMLS and a photo gate signal PG of the TOF camera device shown in FIG. 1.

Referring to FIGS. 1 to 3, the pulse generator 120 may generate a plurality of pulse signals during one period (one frame). For example, the pulse generator 120 may generate first to fourth pulse signals P1 to P4 during a first frame F1 (that is, one period). The light source 110 may irradiate the light SMLS in synchronization with the first to fourth pulse signals P1 to P4 generated from the pulse generator 120. Accordingly, the light SMLS has the same waveform as the pulse signal P.

The image sensor 130 receives the photo gate signal PG from the pulse generator 120. Particularly, the photo gate signal PG includes a 0-degree photo gate signal PG0 that has a phase difference of 0 degrees with respect to the light SMLS, a 90-degree photo gate signal PG90 that has a phase difference of 90 degrees with respect to the light SMLS, a 180-degree photo gate signal PG180 that has a phase difference of 180 degrees with respect to the light SMLS, and a 270-degree photo gate signal PG270 that has a phase difference of 270 degrees with respect to the light SMLS.

The image sensor 130 may receive the reflected light SMLS in synchronization with the 0-degree photo gate signal PG0. The image sensor 130 may receive the reflected light SMLS in synchronization with the 90-degree photo gate signal PG90. The image sensor 130 may receive the reflected light SMLS in synchronization with the 180-degree photo gate signal PG180. The image sensor 130 may receive the reflected light SMLS in synchronization with the 270-degree photo gate signal PG270. The ISP 150 may calculate the amplitude information of the reflected light SMLS, and transmit the amplitude information to the memory device 140.

The distance between the object OJ and the TOF camera device 100 (i.e., the depth of the object OJ) may be calculated using the amplitude information stored in the memory device 140. For example, by multiplying the amplitude information received in the phase differences of 0 degree, 90 degrees, 180 degrees, and 270 degrees by a specific coefficient, the ISP 150 may calculate the distance between the object OJ and the TOF camera device 100 (i.e., the depth of the object OJ) in the first frame.

Likewise, the pulse generator 120 may generate fifth to eighth pulse signals P5 to P8 during a second frame F2 (that is, the next one period after the first period F1). The light source 110 may irradiate the light SMLS in synchronization with the fifth to eighth pulse signals P5 to P8 generated from the pulse generator 120.

Each of the first frame F1 and the second frame F2 is one period, and the TOF camera device 100 repeatedly measures the distance to the object OJ within the same region (that is, range between 0 and dmax) every frame.

Figure 4:
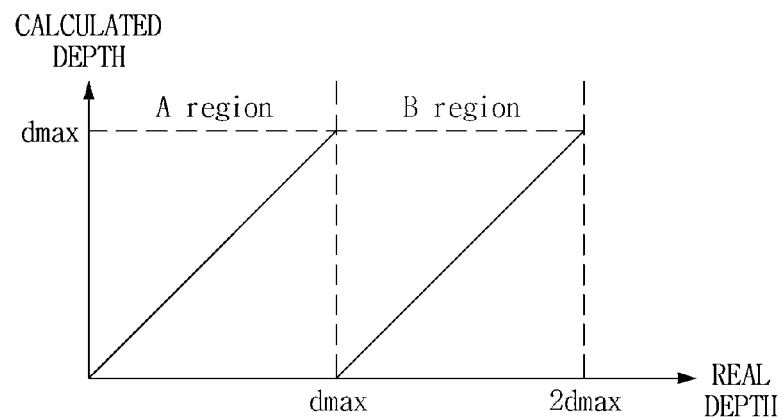
FIG. 4 is a graph showing a relationship between a real depth and a calculated depth.

FIG. 4 is a graph illustrating a relationship between a real depth and a calculated depth.

Referring to FIGS. 1 to 4, a region labeled "A region" is a region that a real distance to the object OJ is within dmax. A region labeled "B region" is a region that a real distance to the object OJ is between dmax and 2 dmax. dmax is a measurable maximum depth which is measurable according to a frequency of the light SMLS.

The TOF camera device 100 may accurately measure a depth in the A region. However, the TOF camera device 100 may not accurately measure a depth in the B region. This is because the measurable maximum depth (that is, dmax) is determined according to the frequency of the light SMLS. Accordingly, when the object OJ is actually within the B region, the TOF camera device 100 may determine that the object OJ is within the A region. That is, images of the A region and the B region are overlapped.

Figure 5:
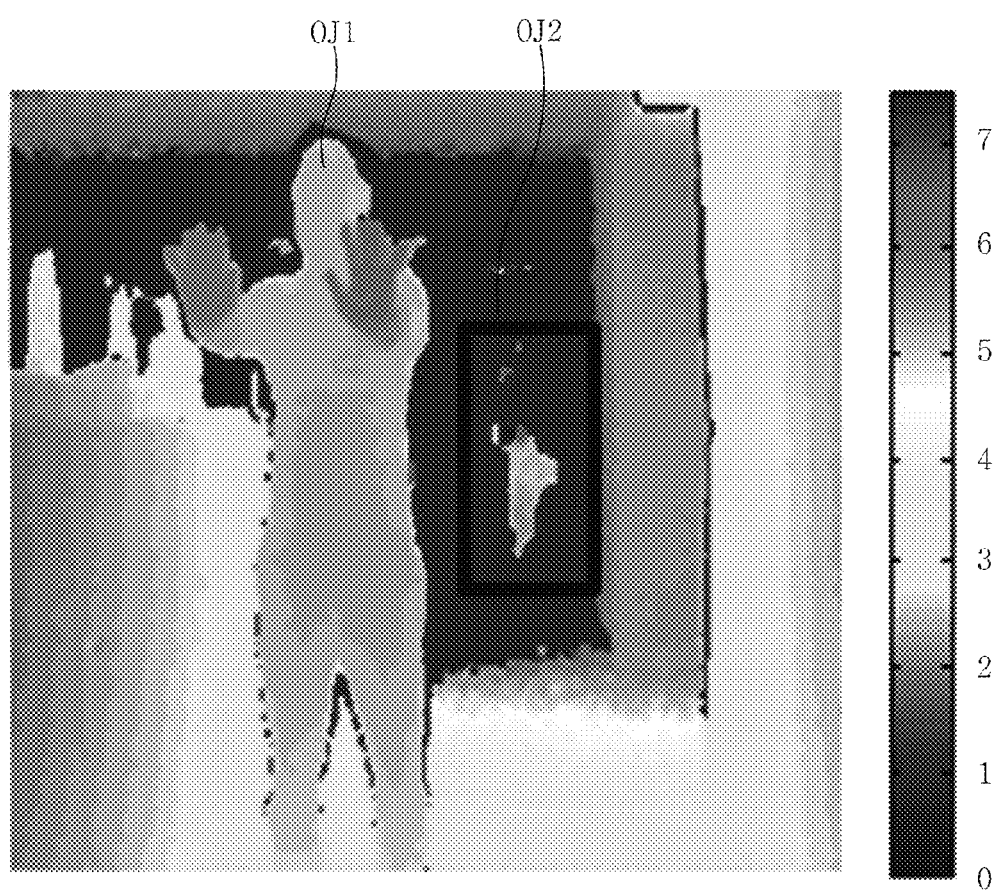
FIG. 5 illustrates an image captured by the TOF camera device shown in FIG. 1.
Figure 6:
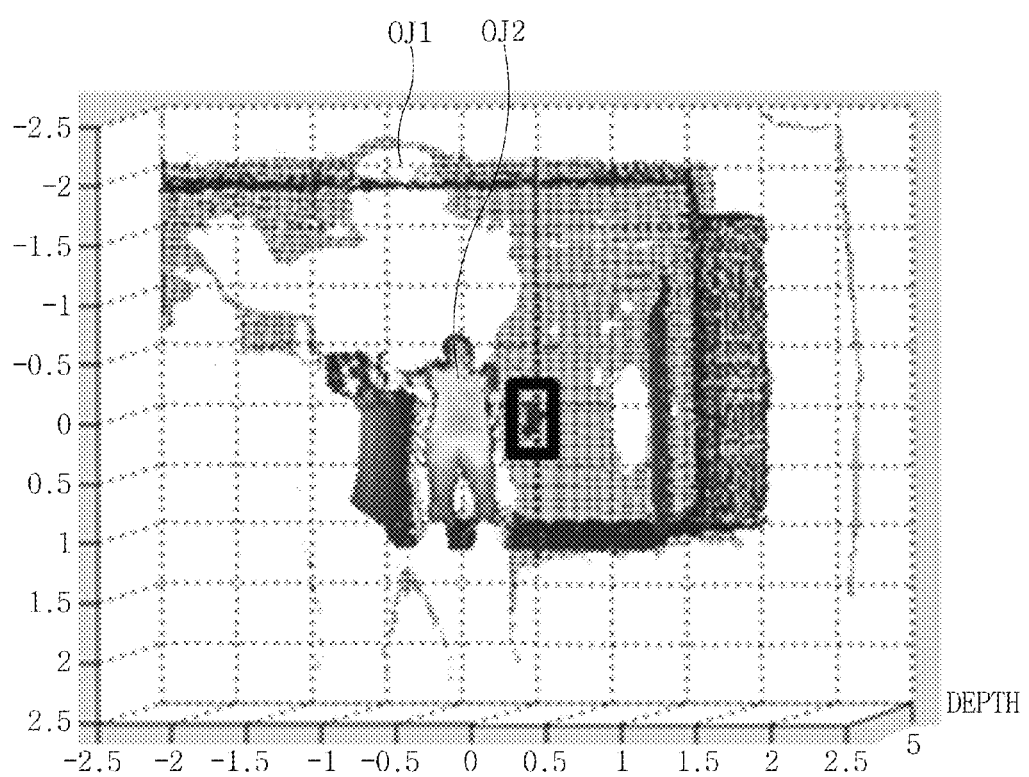
FIG. 6 is a three-dimensional graph with respect to the image shown in FIG. 5.

FIG. 5 illustrates an image captured by the TOF camera device shown in FIG. 1. FIG. 6 is a three-dimensional graph with respect to the image shown in FIG. 5.

Referring to FIGS. 5 and 6, a first object OJ1 is actually closer than a second object OJ2. However, it may be seen that the first object OJ1 is located at the same depth as the second object OJ2. For example, it may be seen that the first object OJ1 and the second object OJ2 are located at the same depth of 3 m. That is the first object OJ1 and the second object OJ2 have the same shading in FIG. 5.

To address this problem, the TOF camera device 100 according to an exemplary embodiment uses the photo gate signal that has different periods according to a frequency of the light SMLS. Accordingly, the measurable maximum depth determined according to the frequency of the light SMLS can be increased.

A method of driving the TOF camera device 100 according to an exemplary embodiment will now be described with reference to FIGS. 7 to 11.

Figure 7:
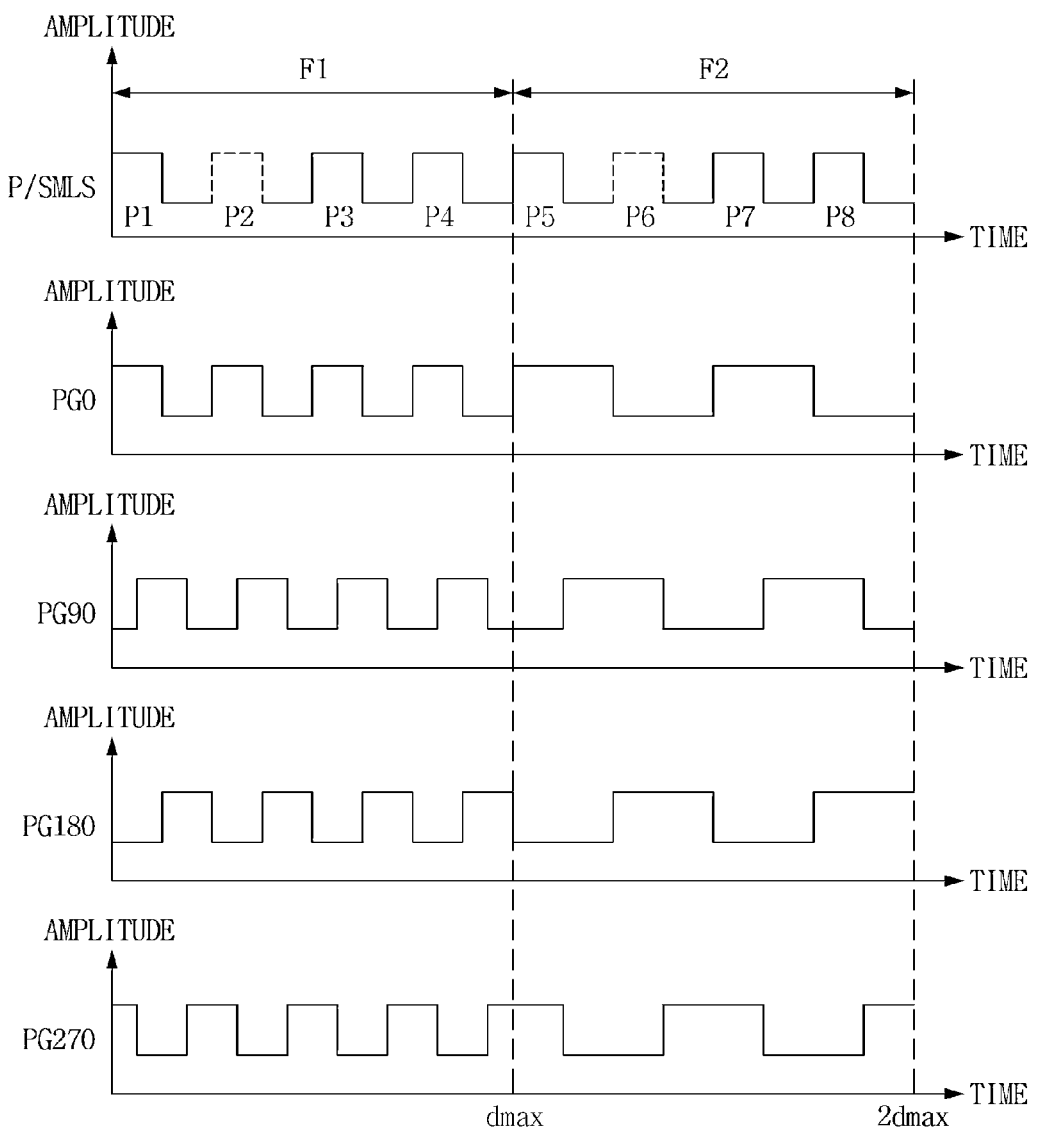
FIG. 7 is a timing diagram for describing a method of driving the TOF camera device shown in FIG. 1.
Figure 8A:
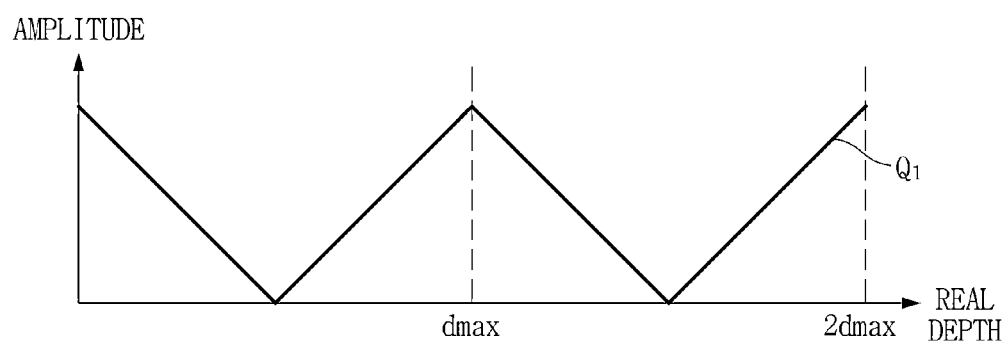
FIGS. 8A to 8D are graphs showing an amplitude of reflected light SMLS received in synchronization with different phases, respectively, of a photo gate signal PG of the timing diagram shown in FIG. 7 during a first frame F1.
Figure 8B:
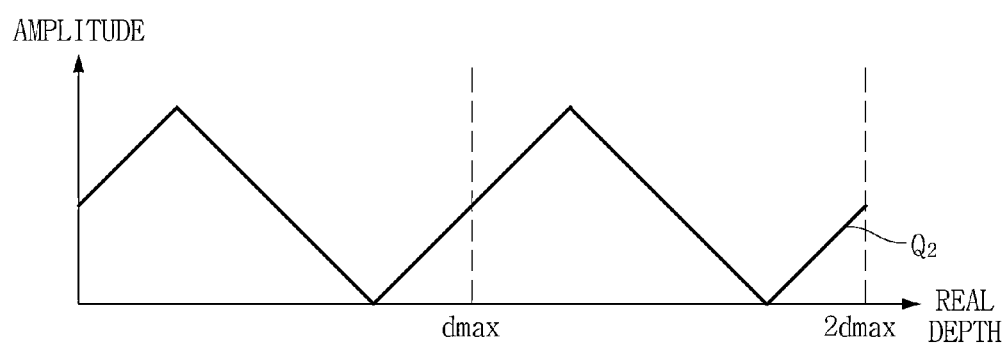
Figure 8C:
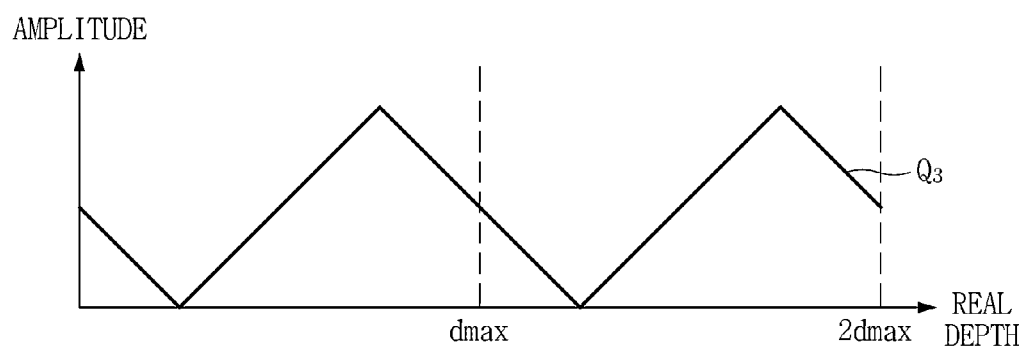
Figure 8D:
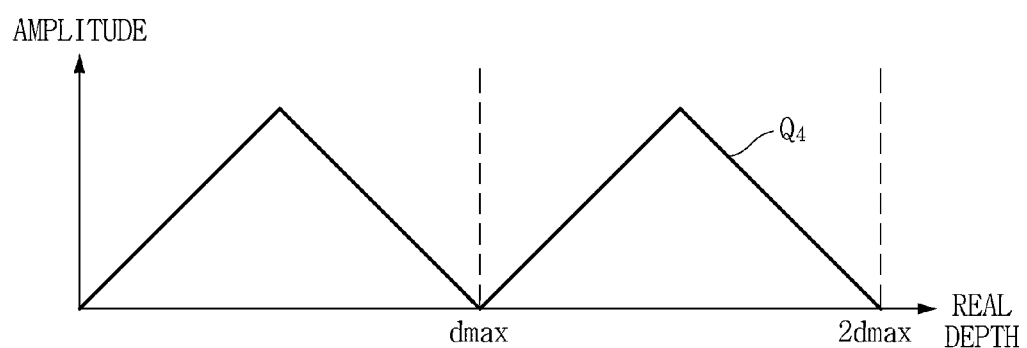
Figure 9A:
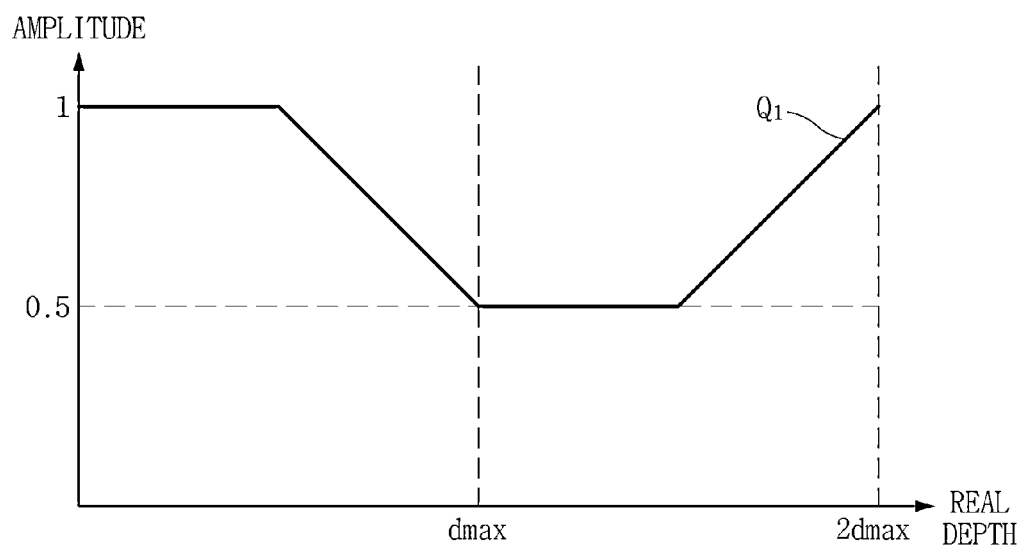
FIGS. 9A to 9D are graphs showing an amplitude of reflected light SMLS received in synchronization with different phases, respectively, of the photo gate signal PG of the timing diagram shown in FIG. 7 during a second frame F2.
Figure 9B:
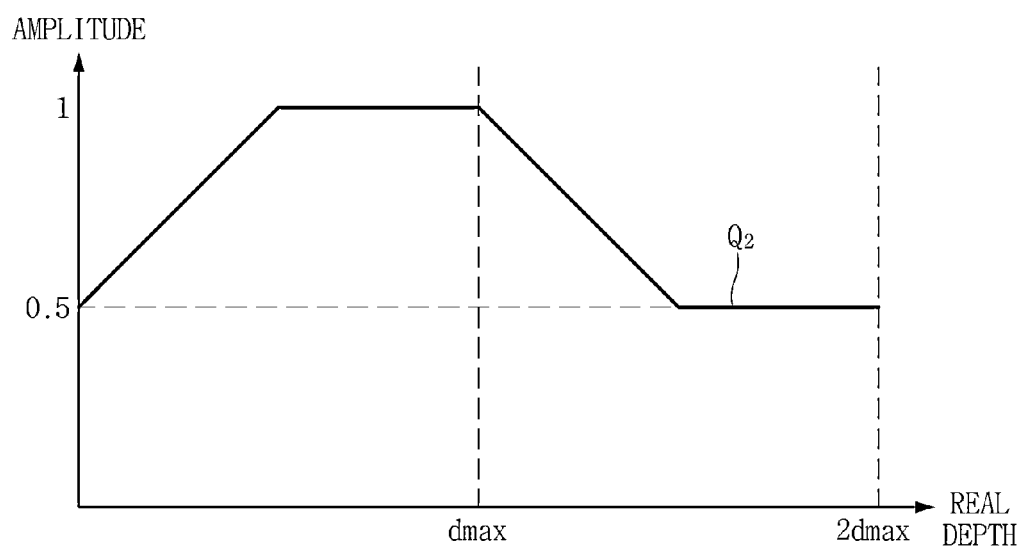
Figure 9C:
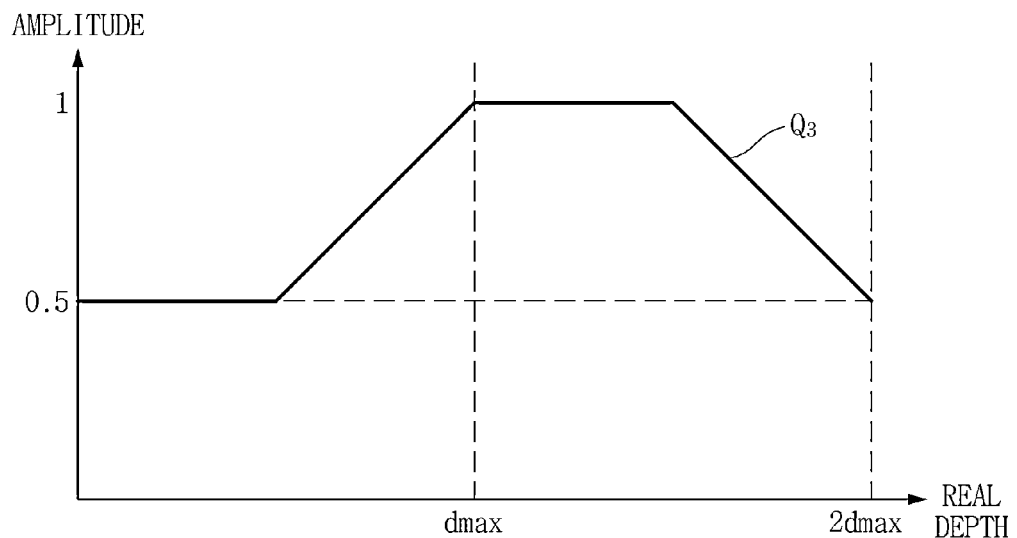
Figure 9D:
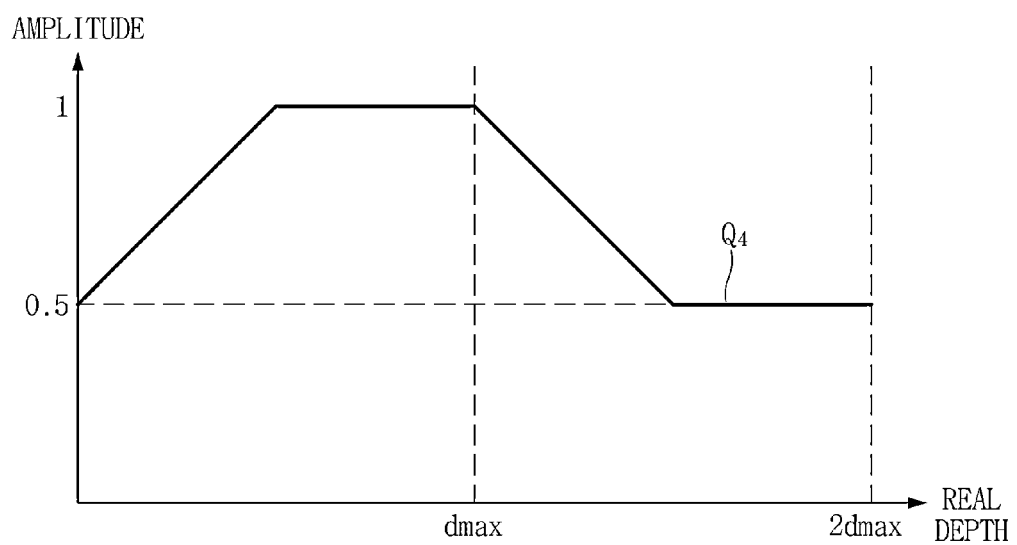

FIG. 7 is a timing diagram for describing a method of driving the TOF camera device shown in FIG. 1.

Referring to FIGS. 1, 2, and 7, the pulse generator 120 modulates a pulse signal P so as to use one frequency. That is, the pulse generator 120 modulates the pulse signal P so as to make the first frame and the second frame as one period.

For example, the pulse generator 120 generates a plurality of pulse signals during one period (the first and second frames). During the first frame F1, the pulse generator 120 generates a first pulse signal P1, a third pulse signal P3, and a fourth pulse signal P4. In the exemplary embodiment shown in FIG. 7, the pulse generator 120 does not generate a second pulse signal P2 such that the light source 110 uses a modulated frequency. The light source 110 irradiates the object OJ with the light SMLS in synchronization with the first, third, and fourth pulse signals P1, P3, P4. During the first frame F1, the image sensor 130 receives the light SMLS reflected from the object OJ in synchronization with a first photo gate signal (that is, the 0-degree photo gate signal PG0, the 90-degree photo gate signal PG90, the 180-degree photo gate signal PG180, and the 270-degree photo gate signal PG270).

Likewise, during the second frame F2, the pulse generator 120 generates a fifth pulse signal P5, a seventh pulse signal P7, and an eighth pulse signal P8. In the exemplary embodiment shown in FIG. 7, the pulse generator 120 does not generate a sixth pulse signal P6 such that the light source 110 uses a modulated frequency. The light source 110 irradiates the object OJ with the light SMLS in synchronization with the fifth, seventh, and eighth pulse signals P5, P7, P8 generated from the pulse generator 120.

During the second frame F2, the image sensor 130 receives the light SMLS reflected from the object OJ in synchronization with a second photo gate signal (that is, the 0-degree photo gate signal PG0, the 90-degree photo gate signal PG90, the 180-degree photo gate signal PG180, and the 270-degree photo gate signal PG270).

One period includes the first and second frames F1 and F2. The pulse generator 120 generates the first, third, fourth, fifth, seventh, and eighth pulse signals P1, P3, P4, P5, P7, P8 so as to receive the reflected light SMLS from the object OJ with different frequencies within one period.

In some exemplary embodiments, a frequency of the first photo gate signal may be two times higher than that of the second photo gate signal. For example, if the frequency of the light SMLS is 20 MHz, the frequency of the photo gate signal PG for receiving the reflected light SMLS may be set at 20 MHz during the first frame F1, and 10 MHz during the second frame F2.

In some exemplary embodiments, the photo gate signal PG during the first frame F1 may have a frequency that is higher by an integer multiple than a frequency of the photo gate signal PG during the second frame F2.

FIGS. 8A to 8D are graphs showing an amplitude of the reflected light SMLS received in synchronization with different phases, respectively, of the photo gate signal PG shown in FIG. 7 during the first frame F1.

Referring to FIGS. 2, 7, and 8A to 8D, a first line Q1 illustrates amplitude with respect to the reflected light SMLS received in synchronization with the 0-degree photo gate signal PG0. A second line $Q_2$ illustrates amplitude with respect to the reflected light SMLS received in synchronization with the 90-degree photo gate signal PG90. A third line Q3 illustrates amplitude with respect to the reflected light SMLS received in synchronization with the 180-degree photo gate signal PG180. A fourth line Q4 illustrates amplitude with respect to the reflected light SMLS received in synchronization with the 270-degree photo gate signal PG270.

The TOF camera device 100 calculates a distance to the object OJ based on the amplitude with respect to the received reflected light SMLS during the first frame F1. For example, the TOF camera device 100 calculates the distance to the object OJ by multiplying the amplitude of the reflected light SMLS corresponding to each of the first to fourth lines Q1 to Q4 by a coefficient. The coefficient may be predetermined.

FIGS. 9A to 9D are graphs showing an amplitude of the reflected light SMLS received in synchronization with different phases, respectively, of the photo gate signal PG shown in FIG. 7 during the second frame F2.

Referring to FIGS. 2, 7, and 9A to 9D, a first line Q1 illustrates amplitude with respect to the reflected light SMLS received in synchronization with the 0-degree photo gate signal PG0. A second line $Q_2$ illustrates amplitude with respect to the reflected light SMLS received in synchronization with the 90-degree photo gate signal PG90. A third line Q3 illustrates amplitude with respect to the reflected light SMLS received in synchronization with the 180-degree photo gate signal PG180. A fourth line Q4 illustrates amplitude with respect to the reflected light SMLS received in synchronization with the 270-degree photo gate signal PG270.

The TOF camera device 100 calculates the distance to the object OJ based on the amplitude with respect to the received reflected light SMLS during the second frame F2. A method that the TOF camera device 100 calculates the distance to the object OJ based on the amplitude with respect to the received reflected light SMLS during the second frame F2 will now be described with reference to FIGS. 10A to 10B.

Figure 10A:
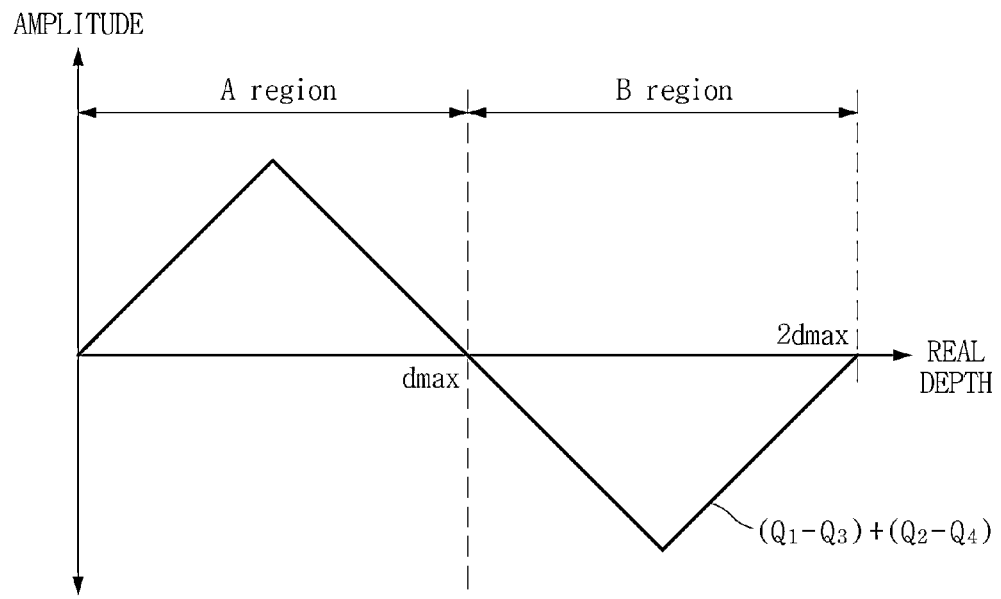
FIG. 10A is a graph showing a line of $(Q_1-Q_3)+(Q_2-Q_4)$ calculated using first to fourth lines $Q_1$ to $Q_4$ shown in FIGS. 9A to 9D.

FIG. 10A is a graph showing a line of $(Q_1-Q_3)+(Q_2-Q_4)$ calculated using the first to fourth lines $Q_1$ to $Q_4$ shown in FIGS. 9A to 9D.

Figure 10B:
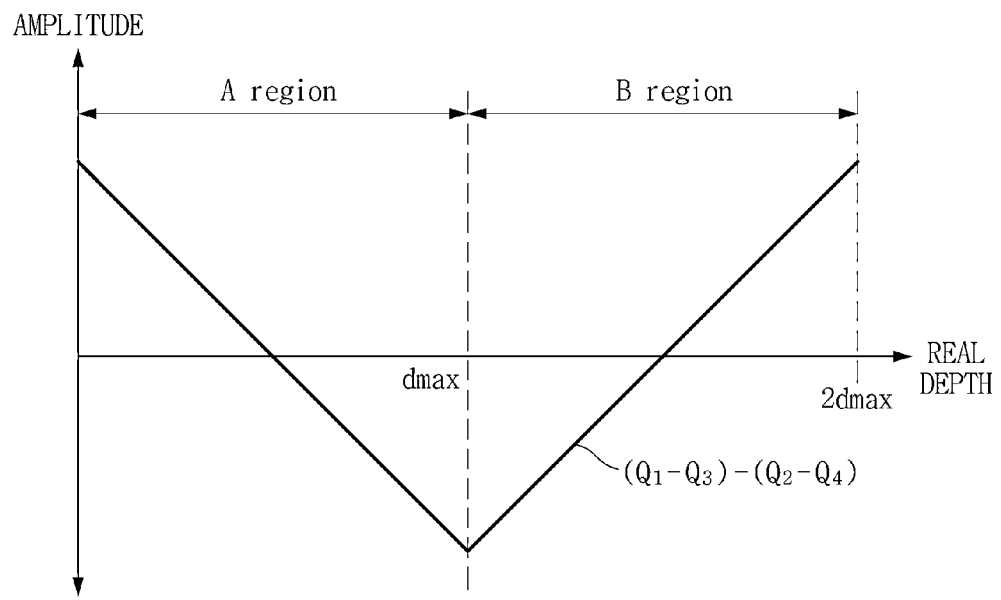
FIG. 10B is a graph showing a line of $(Q_1-Q_3)-(Q_2-Q_4)$ calculated using the first to fourth lines $Q_1$ to $Q_4$ shown in FIGS. 9A to 9D.

FIG. 10B is a graph showing a line of $(Q_1-Q_3)-(Q_2-Q_4)$ calculated using the first to fourth lines $Q_1$ to $Q_4$ shown in FIGS. 9A to 9D.

Referring to FIGS. 1, 2, 10A, and 10B, the TOF camera device 100 generates the $(Q_1-Q_3)+(Q_2-Q_4)$ line shown in FIG. 10A and the $(Q_1-Q_3)-(Q_2-Q_4)$ line shown in FIG. 10B using phase difference information during the second frame F2. The TOF camera device 100 generates the distance to the object OJ by multiplying each of the $(Q_1-Q_3)+(Q_2-Q_4)$ line shown in FIG. 10A and the $(Q_1-Q_3)-(Q_2-Q_4)$ line shown in FIG. 10B by a coefficient. The coefficient may be predetermined.

Figure 11:
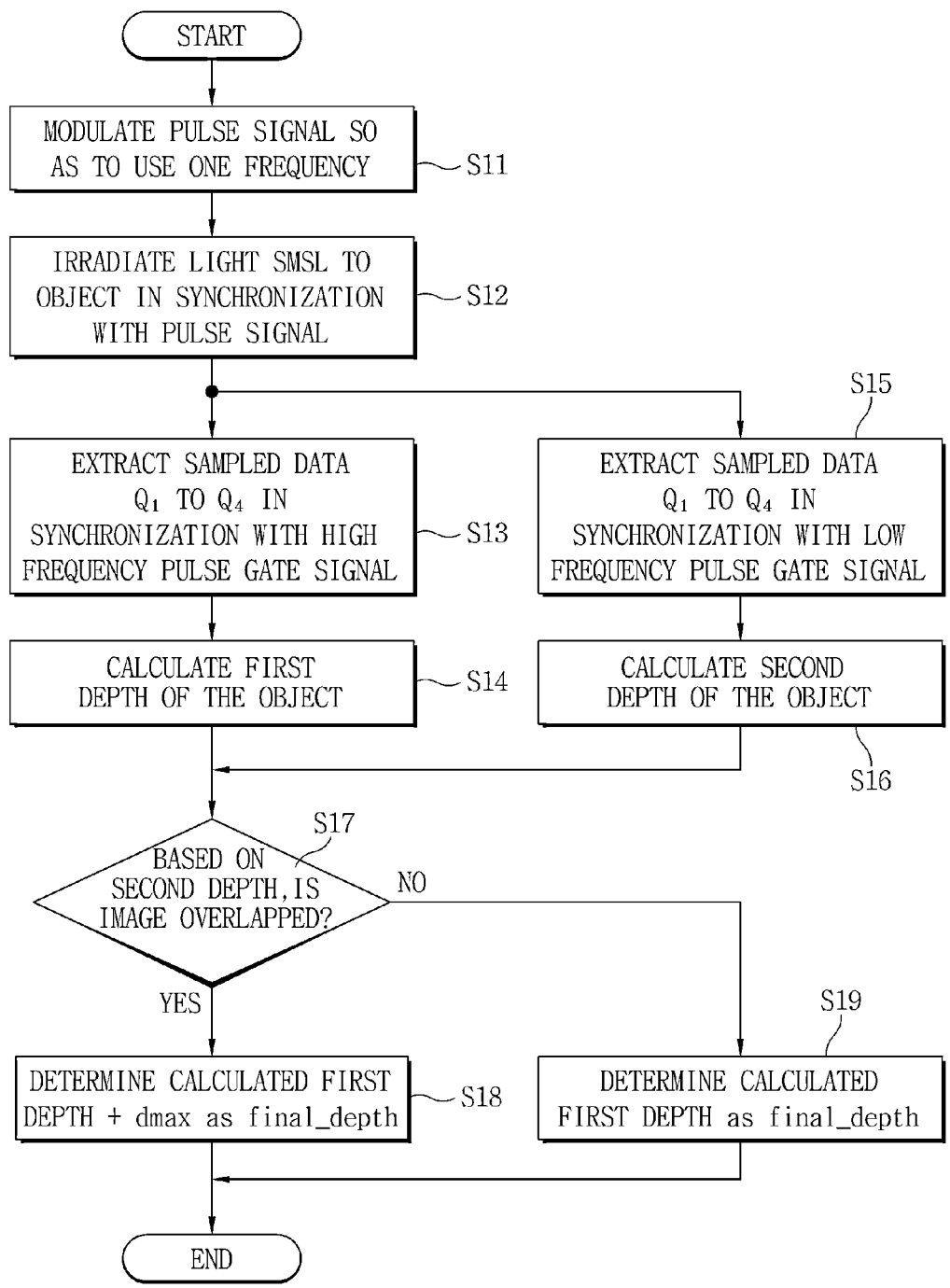
FIG. 11 is a flowchart showing a method of driving the TOF camera device shown in FIG. 1, according to an exemplary embodiment.

FIG. 11 is a flowchart showing a method of driving the TOF camera device shown in FIG. 1, according to an exemplary embodiment.

Referring to FIGS. 1, 2, and 7 to 10, in operation S11, the pulse generator 120 may modulate the pulse signal P for using the frequency of the light SMLS as a single frequency. That is, the pulse generator 120 may modulate the pulse signal P so as to make the first and the second frames as one period.

In operation S12, the light source 110 irradiates the object OJ with the light SMLS in synchronization with the modulated pulse signal P.

In operation S13, the image sensor 130 extracts the sampled data (that is, $Q_1$ to $Q_4$) based on a phase difference between the light SMLS emitted toward the object OJ in synchronization with the pulse signal P, and the light SMLS reflected from the object OJ in synchronization with the photo gate signal PG during the first frame F1. For example, when a frequency of the photo gate signal PG is 20 MHz, the frequency of the photo gate signal PG is 10 MHz.

In operation S14, the ISP 150 calculates a first depth of the object OJ using the sampled data $Q_1$ to $Q_4$ for the first frame.

In operation S15, the image sensor 130 extracts sampled data (that is, $Q_1$ to $Q_4$) based on a phase difference between the light SMLS emitted toward the object OJ in synchronization with the pulse signal P, and the light SMLS reflected from the object OJ in synchronization with the photo gate signal PG during the second frame F2. In this exemplary embodiment, the frequency of the first photo gate signal is two times higher than that of the second photo gate signal. According to some exemplary embodiments, either operation S13 or operation S15 may be performed first.

In operation S16, the ISP 150 calculates a second depth of the object OJ using sampled data $Q_1$ to $Q_4$ for the second frame. When the calculated second depth is greater than the measurable maximum depth dmax, image is overlapped. When the image is overlapped, the object OJ is farther than the measurable maximum depth dmax. For example, even though the object OJ is actually located in the B region (between dmax and 2 dmax), it may be determined that the object OJ is located in the A region (between 0 and dmax) in calculations.

In operation S17, the TOF camera device 100 determines whether the image is overlapped based on the second depth as described above. If the image is overlapped (operation S17, YES), the method proceeds to operation S18. If the image is not overlapped (operation S17, NO), the method proceeds to operation S19.

In operation S18, if the image is overlapped, the TOF camera device 100 determines a value calculated by adding the calculated first depth and the measurable maximum depth dmax as a final depth (that is, a real depth) final_depth.

In operation S19, if the image is not overlapped, the TOF camera device 100 determines the calculated first depth as the final depth final_depth.

Figure 12:
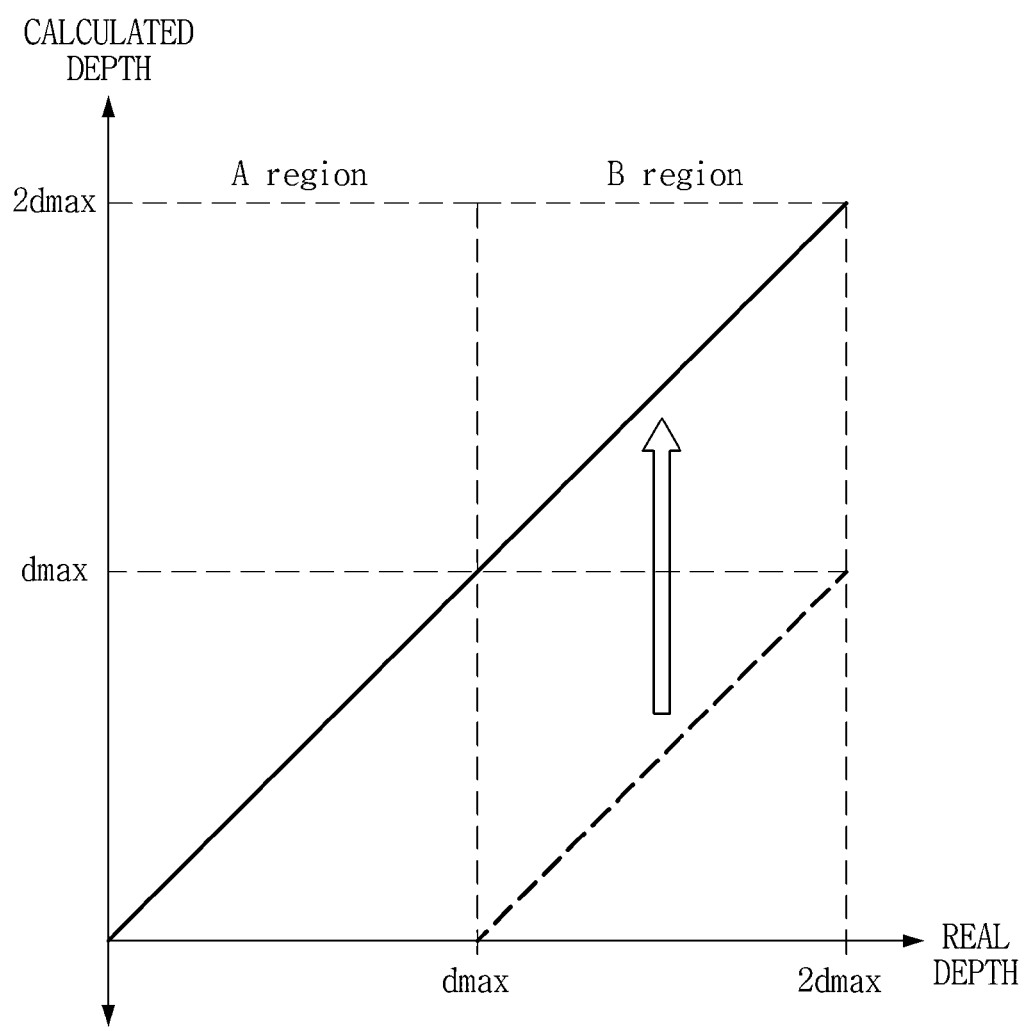
FIG. 12 is a graph showing a result according to the method of driving the TOF camera device shown in FIG. 11.

FIG. 12 is a graph showing a result according to the method of driving the TOF camera device shown in FIG. 11.

Referring to FIGS. 1, 2, 11, and 12, the TOF camera device 100 according to an embodiment of the inventive concept may increase the measurable maximum distance to the object OJ (i.e., the maximum depth of the object OJ) using the first and second photo gate signals having different frequencies, during the first and second frames F1 and F2.

For example, in this exemplary embodiment, if the first photo gate signal PG has a frequency of 20 MHz, the A region is from 0 m to 7.5 m. Further, if the second photo gate signal PG has a frequency of 10 MHz, the B region is from 7.5 m to 15 m. Accordingly, the TOF camera device 100 can measure the final depth of the object OJ (i.e., the distance to the object OJ) which is over the measurable maximum depth (for example, 7.5 m) determined according to the frequency of the light SMLS.

The TOF camera device 100 according to another exemplary embodiment can measure a depth more accurately within the measurable maximum depth dmax. A method of driving the TOF camera device 100 according to another exemplary embodiment will now be described with reference to FIGS. 13 and 14.

Figure 13:
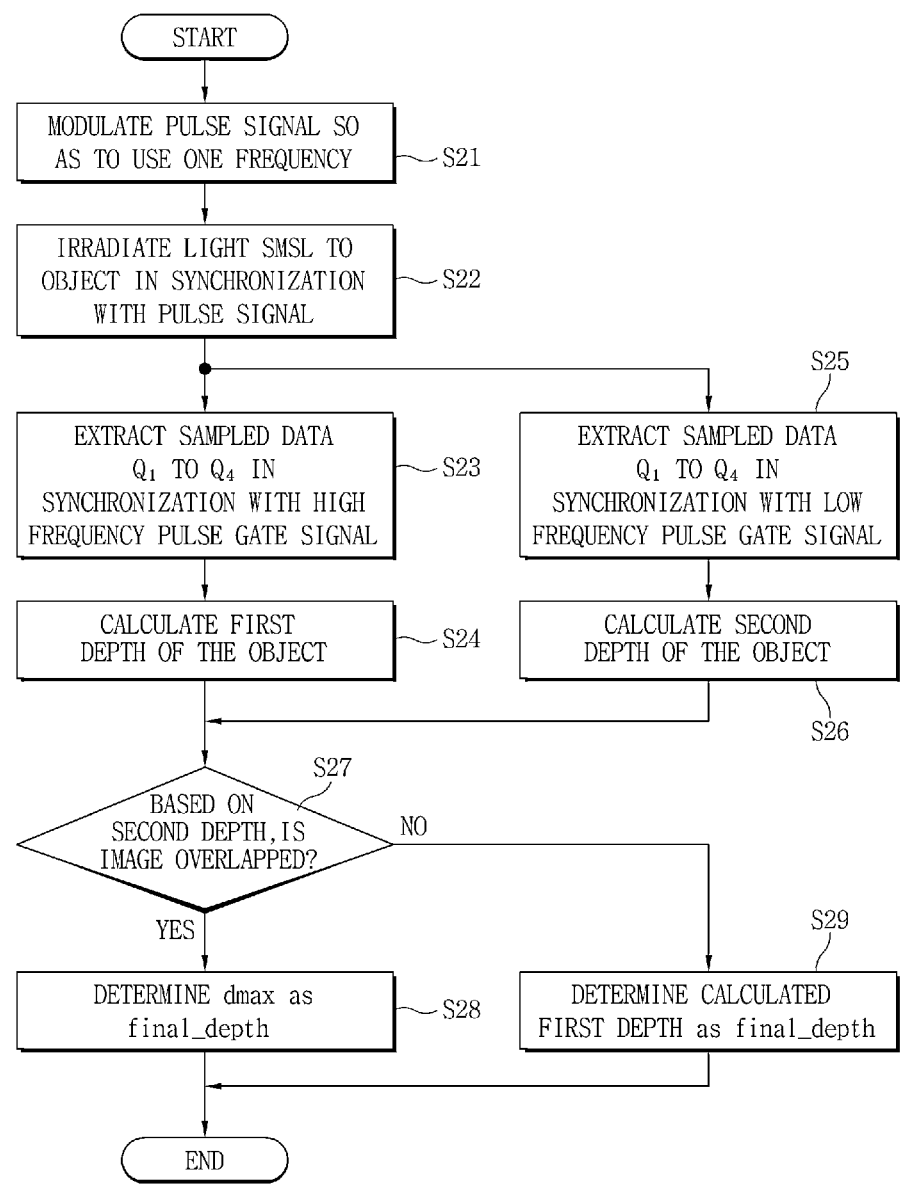
FIG. 13 is a flowchart showing a method of driving the TOF camera device shown in FIG. 1, according to another exemplary embodiment.

FIG. 13 is a flowchart showing a method of driving the TOF camera device shown in FIG. 1, according to another exemplary embodiment.

Referring to FIGS. 1, 3 and 13, in operation S21, the pulse generator 120 modulates the pulse signal P so as to use one frequency. That is, the pulse generator 120 may modulate the pulse signal P so as to make the first and second frames as one period.

In operation S22, the light source 110 irradiates the object OJ with the light SMLS in synchronization with the pulse signal P.

In operation S23, the image sensor 130 extracts sampled data (that is, $Q_1$ to $Q_4$) based on a phase difference between the light SMLS emitted toward the object OJ in synchronization with the pulse signal P, and the light SMLS reflected from the object OJ in synchronization with the first photo gate signal during the first frame F1. For example, when a frequency of the first photo gate signal is 20 MHz, the frequency of the second photo gate signal is 10 MHz.

In operation S24, the ISP 150 calculates a first depth of the object OJ using the sampled data $Q_1$ to $Q_4$ from the first frame F1.

In operation S25, the image sensor 130 extracts sampled data (that is, $Q_1$ to $Q_4$) based on a phase difference between the light SMLS emitted toward the object OJ in synchronization with the pulse signal P, and the light SMLS reflected from the object OJ in synchronization with the second photo gate signal during the second frame F2. The frequency of the first photo gate signal during the first frame F1 is two times higher than that of the photo gate signal PG during the second frame F2.

According to an exemplary embodiment, either operation S23 or operation S25 may be performed first.

In operation S26, the ISP 150 calculates a second depth of the object OJ using the sampled data $Q_1$ to $Q_4$ from the second frame F2. When the calculated second depth is greater than the measurable maximum depth dmax, an image is overlapped. When the image is overlapped, the object OJ is farther than the measurable maximum depth dmax. For example, even though the object OJ is actually located in the B region (between dmax and 2 dmax), it may be determined that the object OJ is located in the A region (between 0 and dmax) in calculations.

In operation S27, the TOF camera device 100 determines whether the image is overlapped. If the image is overlapped (operation S27, YES), the method proceeds to operation S28. If the image is not overlapped (operation S27, NO), the method proceeds to operation S29.

In operation S28, if the image is overlapped, the TOF camera device 100 determines the measurable maximum depth dmax as a final depth (that is, real depth) final_depth. That is, the TOF camera device 100 according to another exemplary embodiment can more accurately display the calculated final depth accurately within the measurable maximum depth dmax on the display device 200. The frequency of the first photo gate signal during the first frame F1 is higher than that of the photo gate signal during the second frame F2. If an object is within the measurable maximum depth dmax, the TOF camera device 100 may calculate the final depth using the calculated information in operation S23. However, if the object is beyond the measurable maximum depth dmax, the TOF camera device 100 may set the final depth as the measurable maximum depth dmax. In operation S29, if the image is not overlapped, the TOF camera device 100 determines the calculated first depth as the final depth final_depth.

The TOF camera device 100 according to another exemplary embodiment as described above can display the calculated final depth within the measurable maximum depth dmax on the display device 200 more accurately. Specifically, the TOF camera device 100 can display more accurate depth information on the display device 200 using the calculated first depth information by the photo gate signal PG during the first frame F1 and the calculated second depth information by the photo gate signal PG during the second frame F2.

Figure 14:
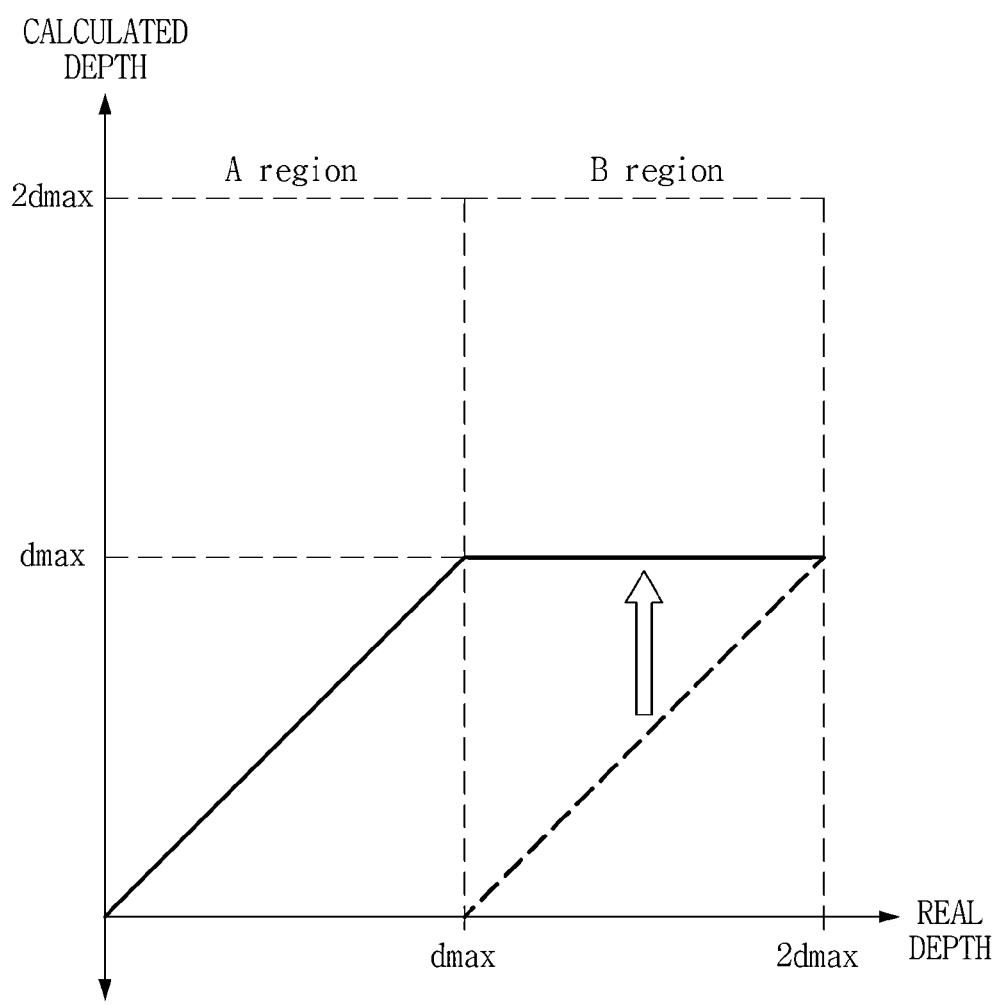
FIG. 14 is a graph showing a result according to the method of driving the TOF camera device shown in FIG. 13.

FIG. 14 is a graph showing a result according to the method of driving the TOF camera device shown in FIG. 13.

Referring to FIGS. 1, 2, 13, and 14, the TOF camera device 100 according to an exemplary embodiment may measure a depth of the object OJ (i.e., a distance to the object OJ) more accurately within the measurable maximum depth, instead of increasing the measurable maximum depth of the object OJ (i.e., the maximum distance to the object OJ) using the first and second photo gate signals having different frequencies during the first and second frames F1 and F2.

For example, in some exemplary embodiments, when the first photo gate signal has a frequency of 20 MHz during the first frame F1, the A region is from 0 m to 7.5 m. Further, when the second photo gate signal has a frequency of 10 MHz during the second frame F2, the B region is from 7.5 m to 15 m.

When the object OJ is located in the A region, the TOF camera device 100 calculates the first depth of the object OJ. When the object OJ is located in the B region, the TOF camera device 100 sets the first depth of the object OJ as dmax (that is, 7.5 m). The TOF camera device 100 can display the final depth of the object OJ (i.e., the distance to the object OJ) more accurately based on the calculated first depth information during the first frame F1 and the calculated second depth information during the second frame F2. Accordingly, the TOF camera device 100 can accurately display the final depth of the object OJ (i.e., the distance to the object OJ) within the measurable maximum depth determined according to the frequency of the light SMLS.

Figure 15:
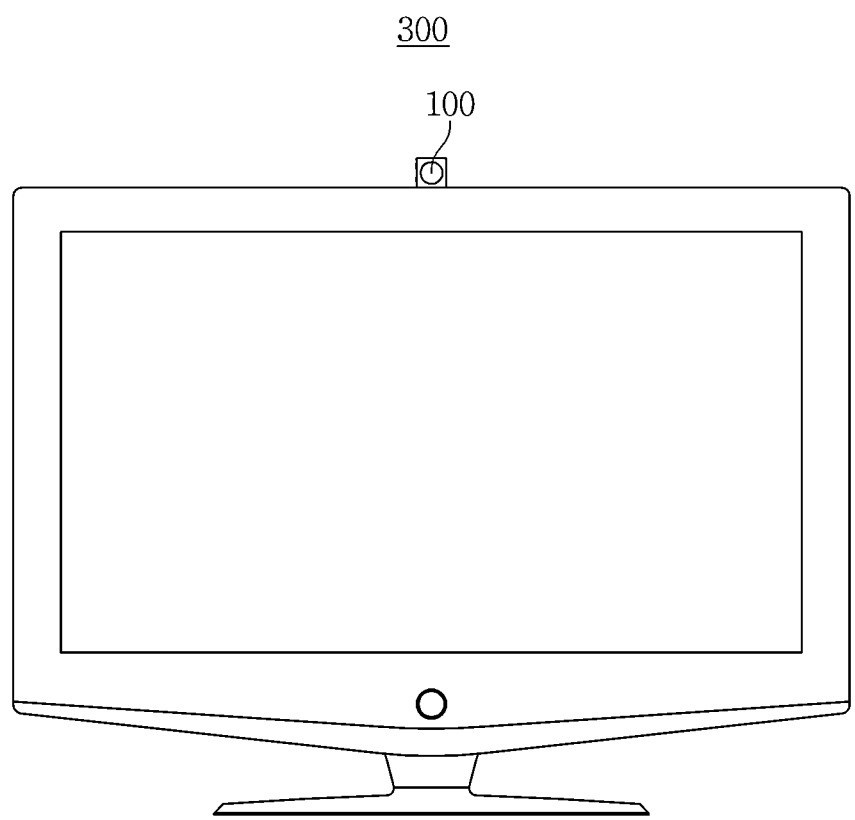
FIG. 15 is a block diagram illustrating a display device including the TOF camera device shown in FIG. 1, according to an exemplary embodiment.

FIG. 15 is a block diagram illustrating a display device including the TOF camera device shown in FIG. 1, according to an exemplary embodiment.

Referring to FIG. 15, a display device 300 may be a display monitor, etc. installed in a smart television (TV), a monitor, and various mobile devices.

The display device 300 may include the TOF camera device 100 shown in FIG. 1. In some exemplary embodiments, the TOF camera device 100 may be a three-dimensional (3D) camera of a Kinect device. In some exemplary embodiments, the TOF camera device 100 may be incorporated into a housing of the display device 300.

Further, the display device 300 may further include an image sensor for capturing an object in front of the display device 300. In some exemplary embodiments, the image sensor may include a CMOS image sensor.

For example, if the display device 300 is embodied as a smart TV, various applications may be installed in the display device 300. The display device 300 may use the TOF camera device 100 to input commands from a user. For example, a gesture of an object in front of the display device 300 may be used as an input for an application.

Figure 16:
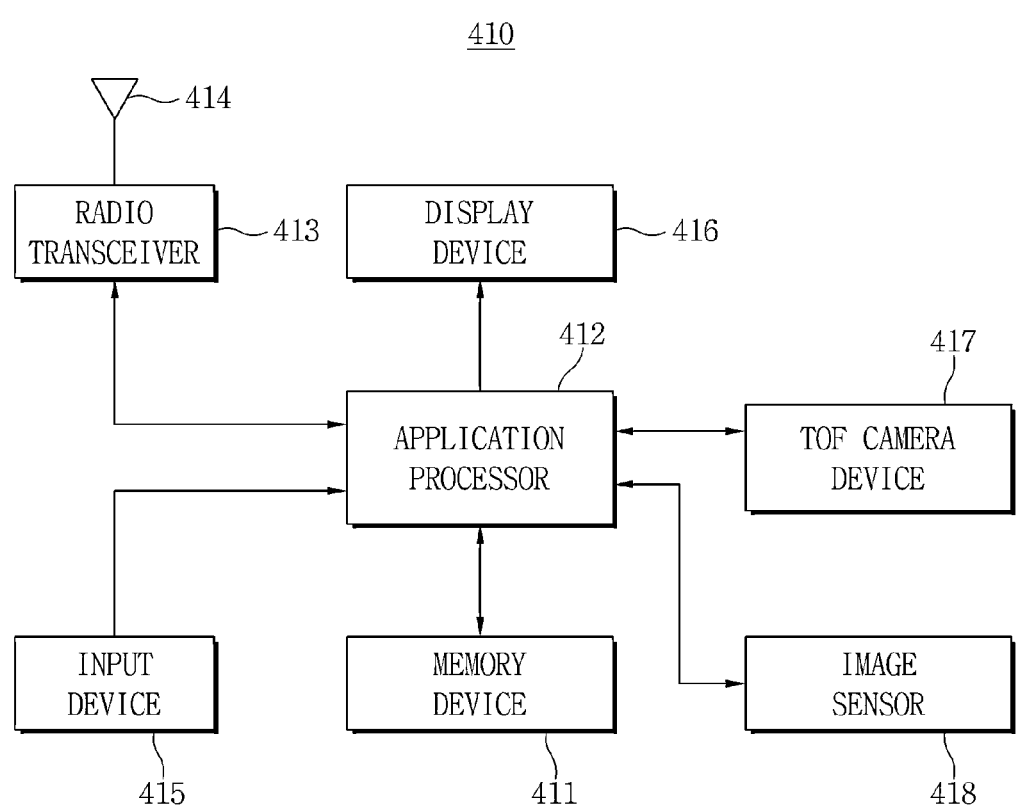
FIG. 16 is a block diagram illustrating a computer system including the TOF camera device shown in FIG. 1, according to an exemplary embodiment.

FIG. 16 is a block diagram illustrating a computer system including the TOF camera device shown in FIG. 1, according to an exemplary embodiment.

Referring to FIG. 16, a computer system 410 may be a smartphone, a personal digital assistant (PDA), a portable multimedia player (PMP), an MP3 player, or an MP4 player, etc.

The computer system 410 includes a memory device 411, an application processor 412 including a memory controller for controlling the memory device 411, a radio transceiver 413, an antenna 414, an input device 415, and a display device 416. The application processor 412 may be a central processing unit (CPU) and may include one or more microprocessors.

The radio transceiver 413 transmits and receives a radio signal through the antenna 414. For example, the radio transceiver 413 converts the radio signal received through the antenna 414 into a signal which can be processed in the application processor 412.

Accordingly, the application processor 412 processes a signal output from the radio transceiver 413, and transmits the processed signal to the display device 416. Further, the radio transceiver 413 converts a signal output from the application processor 412 into a radio signal, and outputs the converted radio signal to an external device through the antenna 414.

The input device 415 is a device for inputting a control signal for controlling an operation of the application processor 412 or data processed by the application processor 412, and may be a pointing device such as a touchpad and a computer mouse, a keypad, or a keyboard.

Further, the computer system 410 may further include a TOF camera device 417 for measuring a depth of an object (i.e., a distance to an object), and an image sensor 418 for capturing a still image or a moving image. The application processor 412 transmits the still image or the moving image received from the image sensor 418 and depth information to the object to the display device 416.

According to some exemplary embodiments, the TOF camera device 417 may be the TOF camera device 100 shown in FIG. 1.

Figure 17:
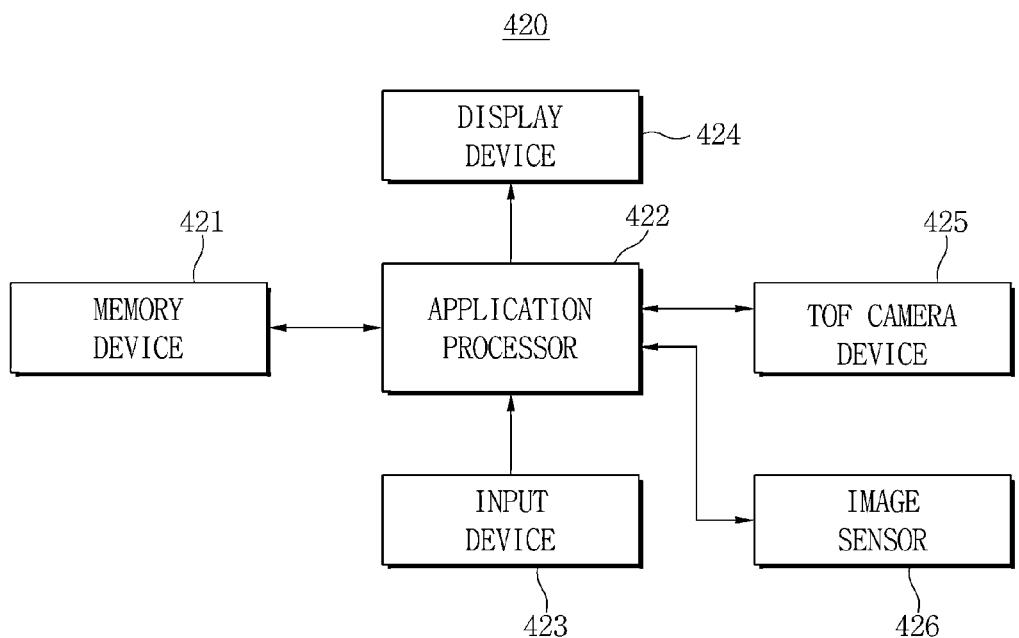
FIG. 17 is a block diagram illustrating a computer system including the TOF camera device shown in FIG. 1, according to another exemplary embodiment.

FIG. 17 is a block diagram illustrating a computer system including the TOF camera device shown in FIG. 1, according to another exemplary embodiment.

Referring to FIG. 17, a computer system 420 may be a personal computer (PC), a network server, a tablet PC, a netbook, or an e-reader, etc.

The computer system 420 includes a memory device 421, an application processor 422 including a memory controller for controlling a data processing operation of the memory device 421, an input device 423, and a display device 424.

The application processor 422 displays data stored in the memory device 421 on the display device 424 according to data input through the input device 423. For example, the input device 423 may be a pointing device such as a touchpad or a computer mouse, a keypad, or a keyboard, etc. The application processor 422 controls overall operations of the computer system 420. The application processor 422 may be a central processing unit (CPU) and may include one or more microprocessors.

Further, the computer system 420 may further include a TOF camera device 425 for measuring a depth of an object (i.e., a distance to the object), and an image sensor 426 for capturing a still image or a moving image. The application processor 422 transmits the still image or the moving image received from the image sensor 426 and depth information to the object to the display device 424.

According to an exemplary embodiment, the TOF camera device 425 may be the TOF camera device 100 shown in FIG. 1.

Figure 18:
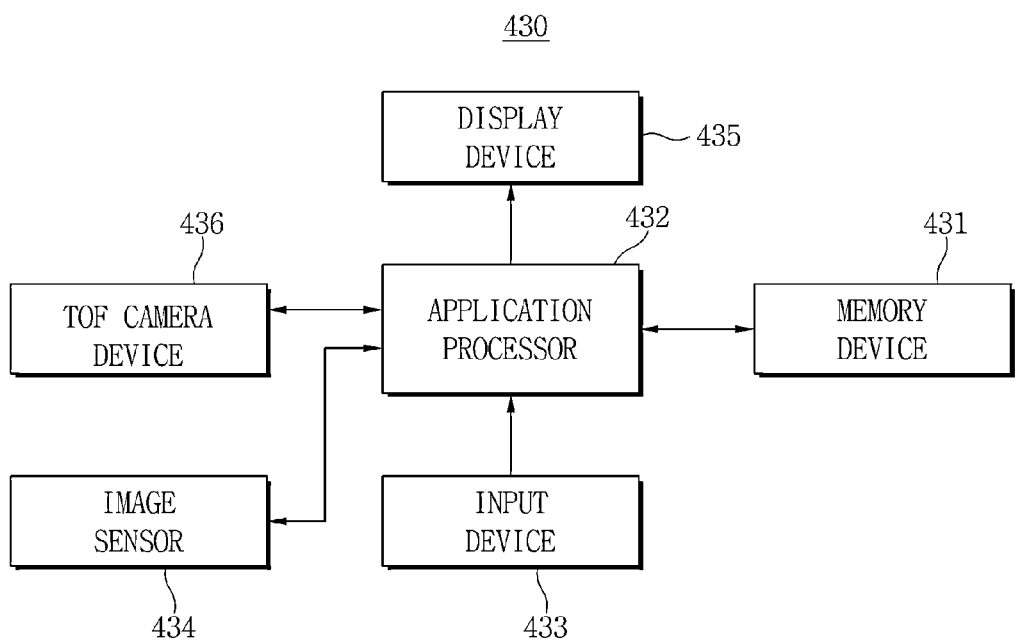
FIG. 18 is a block diagram illustrating a computer system including the TOF camera device shown in FIG. 1, according to yet another exemplary embodiment.

FIG. 18 is a block diagram illustrating a computer system including the TOF camera device shown in FIG. 1, according to yet another exemplary embodiment.

Referring to FIG. 18, a computer system 430 may be an image processing device, for example, a digital camera, or the image processing device may be a mobile phone, a smartphone, or a tablet PC, etc. on which the digital camera is installed.

The computer system 430 includes a memory device 431, an application processor 432 including a memory controller for controlling a data processing operation, for example, a write operation or a read operation, of the memory device 431, an input device 433, an image sensor 434, a display device 435, and a TOF camera device 436.

The image sensor 434 converts an optical image into digital signals, and the converted digital signals are transmitted to the application processor 432. According to the control of the application processor 432, the converted digital signals are displayed on the display device 435, or stored in the memory device 431. The application processor 412 may be a central processing unit (CPU) and may include one or more microprocessors.

The TOF camera device 436 may measure a depth of an object (i.e., a distance to the object). The application processor 432 transmits depth information to the display device 435. Further, the application processor 432 transmits image data stored in the memory device 431 to the display device 435.

According to an exemplary embodiment, the TOF camera device 436 may be the TOF camera device 100 shown in FIG. 1.

The TOF camera device according to exemplary embodiments can measure a real depth even when the object is located at a position with respect to the TOF camera device that is over the measurable maximum depth determined according to the modulated frequency.

Further, the TOF camera device can measure the real depth more accurately within the depth determined according to the modulated frequency.

The foregoing is illustrative of exemplary embodiments and is not to be construed as limiting thereof. Although a few exemplary embodiments have been described, those skilled in the art will readily appreciate that many modifications are possible without materially departing from the novel teachings and advantages. Accordingly, all such modifications are intended to be included within the scope of this inventive concept as defined in the claims. In the claims, means-plus-function clauses are intended to cover the structures described herein as performing the recited function, and not only structural equivalents but also equivalent structures.

What is claimed is:

1. A time of flight camera device comprising:
   a pulse generator configured to generate a pulse signal, a first photo gate signal and a second photo gate signal;
   a light source configured to emit first light in synchronization with the pulse signal to irradiate an object with the first light; and
   an image sensor configured to receive second light reflected from the object in synchronization with the first photo gate signal during a first frame, and receive third light reflected from the object in synchronization with the second photo gate signal during a second frame,
   wherein the pulse generator is configured to modulate the pulse signal so as to use a frequency of the first light as a single frequency,
   wherein a pulse signal frequency of the pulse signal is equal to a first photo gate signal frequency of the first photo gate signal, and
   the first photo gate signal frequency is higher by an integer multiple than a second photo gate signal frequency of the second photo gate signal.

2. The time of flight camera device according to claim 1, wherein the first photo gate signal has a first phase, and the second photo gate signal has a second phase different from the first phase.

3. The time of flight camera device according to claim 1, wherein the pulse generator is configured to modulate the pulse signal so as to make the first frame and the second frame as one period.

4. The time of flight camera device according to claim 1, wherein the image sensor is configured to generate amplitude information based on phase difference information between the first light and the second light and the third light.

5. The time of flight camera device according to claim 4, further comprising an image signal processor configured to generate depth information of the object based on the amplitude information.

6. The time of flight camera device according to claim 5, wherein the image signal processor is configured to determine a gesture of the object using the depth information.

7. The time of flight camera device according to claim 5, wherein the image signal processor is configured to determine a first depth of the object within a first region during the first frame and a second depth of the object within a second region during the second frame, and the second region includes the first region.

8. The time of flight camera device according to claim 7, wherein the image signal processor is configured to determine whether an image is overlapped, and in response to determining the image is overlapped, add the first depth and a measurable maximum depth.

9. The time of flight camera device according to claim 1, wherein the image sensor is configured to receive the second light or the third light reflected from the object while the first photo gate signal or the second photo gate signal is activated.

10. A method of driving a time of flight camera device, the method comprising:
  modulating a pulse signal;
  emitting first light in synchronization with the pulse signal to irradiate an object with the first light;
  receiving second light reflected from the object in synchronization with a first photo gate signal during a first frame, and determining a first depth of the object based on the second light;
  receiving third light reflected from the object in synchronization with a second photo gate signal during a second frame, and determining a second depth of the object based on the third light;
  determining whether an image is overlapped; and
  in response to determining the image is overlapped, adding the first depth and a measurable maximum depth.

11. The method of driving the time of flight camera device according to claim 10, wherein the modulating the pulse signal comprises modulating the pulse signal so as to make the first frame and the second frame as one period.

12. The method of driving the time of flight camera device according to claim 10, wherein the receiving the second light reflected from the object in synchronization with the first photo gate signal during the first frame, and determining the first depth of the object based on the second light reflected from the object during the first frame, comprises:
  extracting first amplitude information based on phase difference information between the first light and the second light; and
  determining the first depth of the object based on the first amplitude information.

13. The method of driving the time of flight camera device according to claim 12, wherein the receiving of the third light reflected from the object in synchronization with the second photo gate signal during the second frame, and determining the second depth of the object based on the third light, comprises:
  extracting second amplitude information based on the phase difference information between the first light and the third light; and
  determining the second depth of the object based on the second amplitude information.

14. The method of driving the time of flight camera device according to claim 10, wherein the determining whether the image is overlapped comprises determining whether the image is overlapped based on the second depth, during the second frame.

15. The method of driving the time of flight camera device according to claim 10, wherein a pulse signal frequency of the pulse signal is equal to a first photo gate signal frequency of the first photo gate signal, and
  the first photo gate signal frequency is two times higher than a second photo gate frequency of the second photo gate signal.

16. A time of flight camera device comprising:
  a pulse generator configured to generate a pulse signal and a plurality of pulse gate signals, each pulse gate signal having a different frequency;
  a light source configured to irradiate an object with light emitted in synchronization with the pulse signal;
  an image sensor configured to receive light reflected from the object in synchronization with pulse gate signals; and
  an image signal processor configured to determine, in a determination, whether an image is overlapped based on the light that is received, and determine a depth of the object according to a result of the determination,
  wherein the pulse generator is configured to modulate the pulse signal so as to use a frequency of the light as a single frequency.

17. The time of flight camera device according to claim 16, wherein the plurality of pulse gate signals comprises a first pulse gate signal and a second pulse gate signal, the first pulse gate signal having a first frequency, and the second pulse gate signal having a second frequency lower than the first frequency.

18. The time of flight camera device according to claim 16, wherein the plurality of pulse gate signals comprises a first pulse gate signal and a second pulse gate signal, and
  wherein the image signal processor determines a first preliminary depth according to the light received in synchronization with the first pulse gate signal and a second preliminary depth according to the light received in synchronization with the second pulse gate signal, and determines whether the image is overlapped based on the second preliminary depth.

19. The time of flight camera device according to claim 18, wherein the image signal processor determines that the image is overlapped when the second preliminary depth is greater than a measurable maximum depth, and that the image is not overlapped when the second preliminary depth is less than or equal to the measureable maximum depth, and when the image is overlapped, calculates the depth by adding the measurable maximum depth to the first preliminary depth.

20. The time of flight camera device according to claim 19, wherein, when the image is not overlapped, the image signal processor calculates the depth as the first preliminary depth.

* * * * *